US007160064B2

(12) United States Patent
Jasso

(10) Patent No.: US 7,160,064 B2
(45) Date of Patent: Jan. 9, 2007

(54) HOLE SAW SLUG REMOVAL DEVICE

(76) Inventor: Abelardo Jasso, 9087 Rosecrest La., Fontana, CA (US) 92335

( * ) Notice: Subject to any disclaimer, the term of this patent is extended or adjusted under 35 U.S.C. 154(b) by 352 days.

(21) Appl. No.: 10/817,944

(22) Filed: Apr. 6, 2004

(65) Prior Publication Data
US 2005/0220547 A1 Oct. 6, 2005

(51) Int. Cl.
*B23B 51/04* (2006.01)
(52) U.S. Cl. .................. 408/68; 408/204; 408/703
(58) Field of Classification Search ............ 408/68, 408/204, 206, 207, 703
See application file for complete search history.

(56) References Cited

U.S. PATENT DOCUMENTS

| 1,234,467 | A | * | 7/1917 | Hamilton | ............ 408/68 |
| 1,589,293 | A | * | 6/1926 | Daley | |
| 3,265,104 | A | * | 8/1966 | Gallo, Sr. | ............ 408/68 |
| 3,390,596 | A | * | 7/1968 | Trevathan | ............ 408/68 |
| 4,652,185 | A | | 3/1987 | Malrick | |
| 5,816,752 | A | | 10/1998 | Benjamin | |
| 2004/0191015 | A1 | * | 9/2004 | Kozak | ............ 408/67 |

FOREIGN PATENT DOCUMENTS

CH           242676     * 11/1946
JP       2003145330 A  *  5/2003

* cited by examiner

*Primary Examiner*—Monica Carter
*Assistant Examiner*—J Williams
(74) *Attorney, Agent, or Firm*—Richard C. Litman

(57) ABSTRACT

The hole saw slug removal device is a device constructed to fit within a hole saw that provides for automatic ejection of waste slugs from within the hole saw. The hole saw slug removal device generally consists of two discs affixed on either end of a compression spring. The device is then inserted into the hole saw, and one disc retains the compression spring within the hole saw by locking onto the drill bit or against the inner surface of the hole saw. Upon operation of the hole saw, the spring compresses and the other disc is pushed down by the force of the sawing. After the sawing is completed, the spring decompresses, and the disc is pushed forward, automatically ejecting the waste slug that has become trapped within the hole saw. The slug removal device may lack one disc and instead be permanently affixed to a hole saw.

6 Claims, 6 Drawing Sheets

HOLE SAW SLUG REMOVAL DEVICE

BACKGROUND OF THE INVENTION

1. Field of the Invention

The present invention relates to slug removal devices and, more specifically, to a hole saw slug removal device used to automatically eject plugs that have been sawed from material.

2. Description of the Related Art

A hole saw is a type of saw used in drilling circular holes in various materials, such as wood, metal, drywall, etc. The hole saw typically has a cylindrical body, one edge of which is serrated. In addition, the cylindrical body contains openings at both ends that allow for a drill bit to be extended therefrom. The drill bit juts out just beyond the serrated edge and stabilizes the hole saw against the surface of the material. When used with a drill power source, the serrated edge of the hole saw body rotates, creating circular holes in the material.

A substantial problem that is faced in employing the hole saw to drill holes in a surface is that the waste left over, typically called a slug, is difficult to extract from within the body of the hole saw. The user is required to stop after each hole is sawed and manually extract the slug from the hole saw. This manual slug removal technique is time-consuming and takes substantial effort for the user. Thus, a hole saw which allows for quick removal of the slug provides much greater use for the user. Automatic removal of the slug would be preferential to non-automatic slug removal.

The related art endeavors to solve the problem of slug removal by either developing different types of hole saws to eject the slugs or by developing a slug removal device to be connected to the hole saw.

U.S. Pat. No. 3,390,596, issued Jul. 2, 1968 to Trevathan, discloses a cutting head assembly which may be utilized to bore circular holes. The cutting head assembly has a cylindrical body, with a plurality of cutting teeth on one edge of the body. The plurality of cutting teeth appear to preferably consist of inwardly and outwardly extending teeth. A spring is positioned within the body portion, and a spring-actuated disc is inserted within the cylindrical body, the disc being used to decrease distortion in the hole shape. The disc and spring appear to be held within the cylindrical body of the cutting head assembly by the inwardly extending teeth. When attached to a power source, the cutting head assembly is rotatably driven about its axis such that a hole is cut into the surface of the material on which it is placed.

U.S. Pat. No. 4,652,185, issued Mar. 24, 1987 to Malrick, shows a hole saw and slug removing device. The hole saw has a cylindrical body through which a drill bit may pass, one edge o the cylindrical body being serrated such that when the hole saw is used, a circular hole is drilled into a surface. A plug member is positioned within the hole saw using a set of screws inserted through an annular collar and into the plug member. The screws maintain the plug member within the hole saw. It appears that a spring may be positioned within the hole saw between an inner portion of the hole saw and the plug member and become compressed when the hole saw is operated. After the hole has been made, the hole saw operator may extract the slug from within the hole saw by manually pressing down on the annular collar.

U.S. Pat. No. 5,816,752, issued Oct. 6, 1998 to Benjamin, describes a slug removal system. The system includes a knock-out device which ejects slugs after a hole is drilled using a hole saw. The knock-out device has a cylindrical body which is tapered at one end and fits inside the hole saw. A spring is included as part of the slug removal system. As the hole saw is used, the knock-out device is pushed back against the spring. When the hole is completed, the spring decompresses, ejecting the slug from within the hole saw. A set of screws secures the knock-out device to the hole saw at predetermined depths.

Although the related art does address devices for slug removal, what is needed is a simple device, easily constructed, that automatically removes slugs. What is further needed is a device for slug removal that may be attached to hole saws that lack a slug removal device. The device should allow for simple insertion within the body of a hole saw and should not require the addition of attachment means that are situated on the outside of the hole saw body. Further, it is advantageous to have a slug removal device that may be removed and later reattached to a hole saw.

None of the above inventions and patents, taken either singly or in combination, is seen to describe the instant invention as claimed. Thus a hole saw slug removal device solving the aforementioned problems is desired.

SUMMARY OF THE INVENTION

The hole saw slug removal device is a center device constructed to fit within a hole saw. The slug removal device provides for automatic ejection of waste slugs from within the body of the hole saw. The hole saw slug removal device generally includes a compression spring fixed between two discs, the discs being affixed to the spring. The device is then inserted within the hole saw. Upon operation of the hole saw, the spring compresses and one disc is pushed down by the force of the sawing. After sawing is completed, the spring decompresses, and the disc is pushed up. The disc then automatically ejects the waste slug that has become trapped within the hole saw.

In one embodiment, the disc to be inserted into the hole saw has a center opening with internal teeth and is convexly shaped. The hole saw slug removal device is pressed into the hole saw, and when the user determines, the device will lock into the hole saw by latching against the drill bit. In another embodiment, the disc to be inserted into the hole saw has external teeth and is concavely shaped. Following depression into the hole saw, when the user determines, the device locks into the hole saw by latching against the hole saw body. In another embodiment, the lower disc is omitted and the hole saw slug removal device with the spring and one top disc is permanently affixed to the bottom of the hole saw.

One aspect of the invention is that the hole saw slug removal device provides for automatic removal of waste slugs in contrast to more time-consuming manual removal of the slugs. Another aspect of the invention is that the hole saw slug removal device may be provided as a separate piece from the hole saw. It may be purchased at a separate time from the hole saw, then inserted and "locked" within the hole saw for convenient slug removal. In one embodiment, the device may be removed from the hole saw, so that the slug removal device may be reused. A further aspect of the invention is that the slug removal device has a simple design, allowing for minimal expense in the construction of the device. The simple design lacks additional costly or obtrusive elements such as screws or the like to attach the slug removal device to the hole saw.

The invention provides improved elements and arrangements thereof for the purposes described and is inexpensive, dependable and fully effective in accomplishing its intended purposes.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
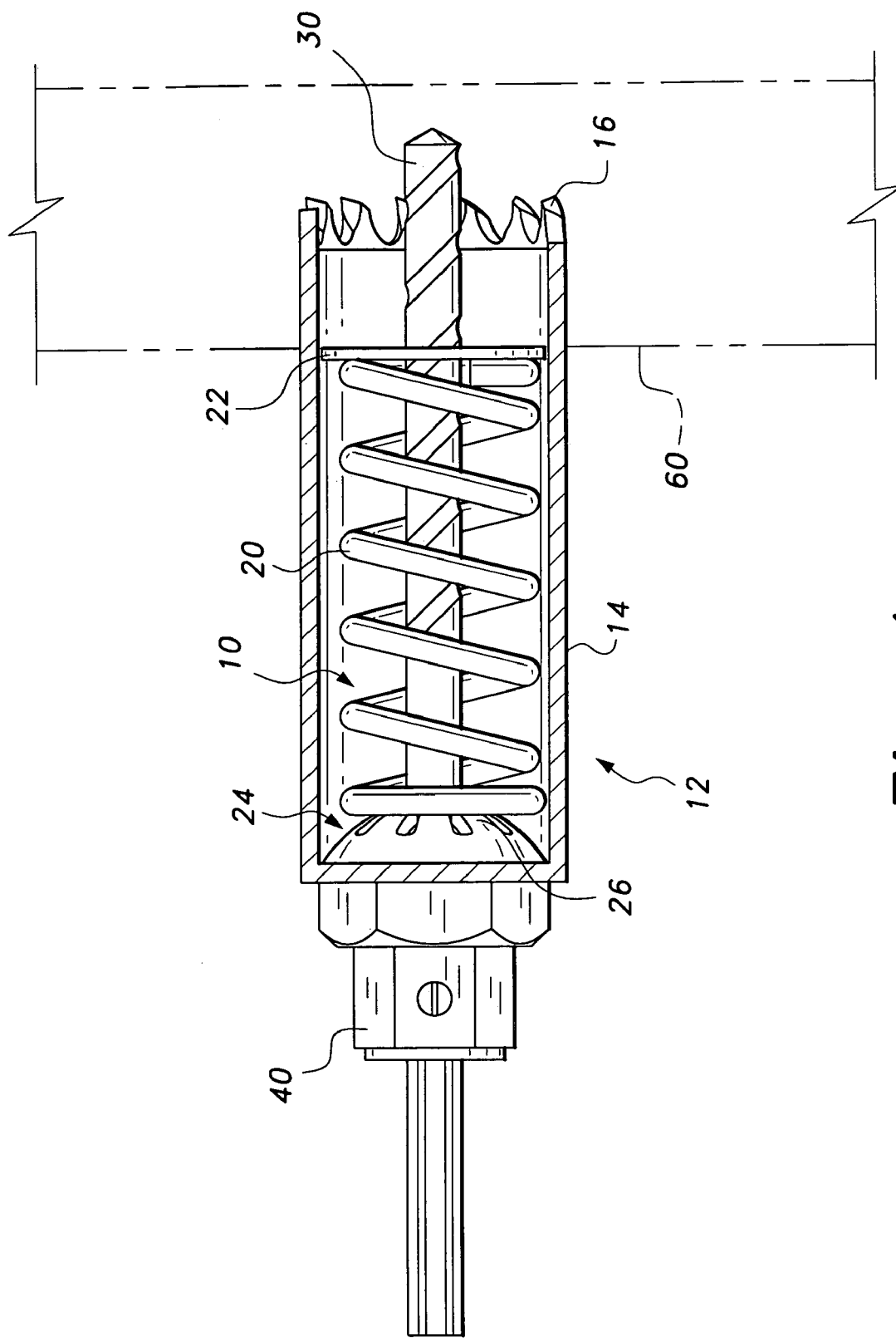
FIG. 1 is an elevational side view of a hole saw and hole saw slug removal device, partly in section, according to a first embodiment of the present invention.
Figure 2:
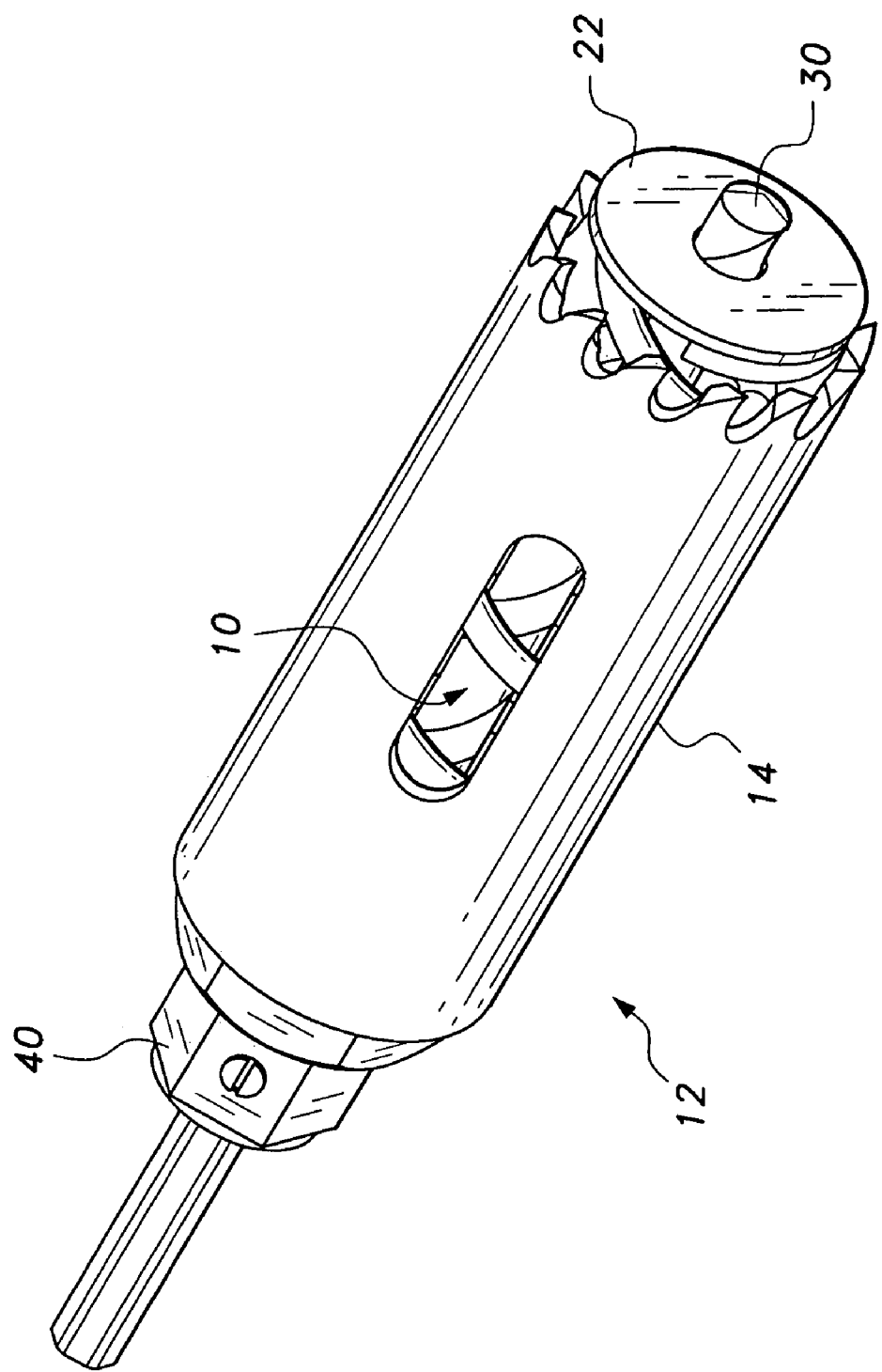
FIG. 2 is a perspective view of the hole saw and hole saw slug removal device as shown in FIG. 1.
Figure 4:
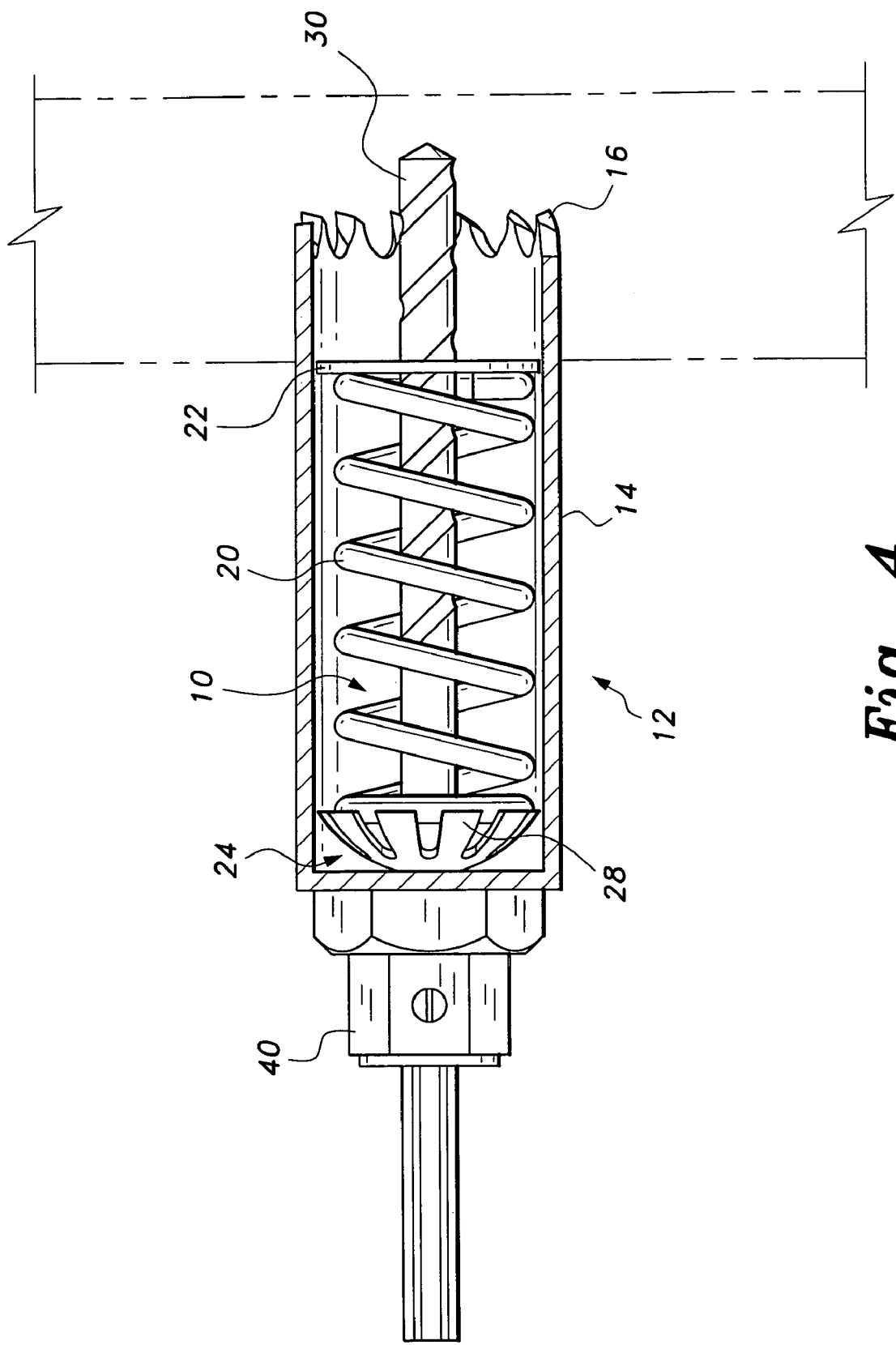
FIG. 4 is an elevational side view of a hole saw and hole saw slug removal device, partly in section, according to a second embodiment of the present invention.

The present invention is a hole saw slug removal device, designated generally as 10 in the drawings. The hole saw slug removal device 10 is designed to fit inside a hole saw 12, as shown in FIGS. 1, 2 and 4. The hole saw 12 includes a cylindrical body 14 having two openings to allow for a drill bit 30 to be inserted therein. A serrated edge 16 of the cylindrical body 14 is used for cutting into a material surface 60.

Figure 3:
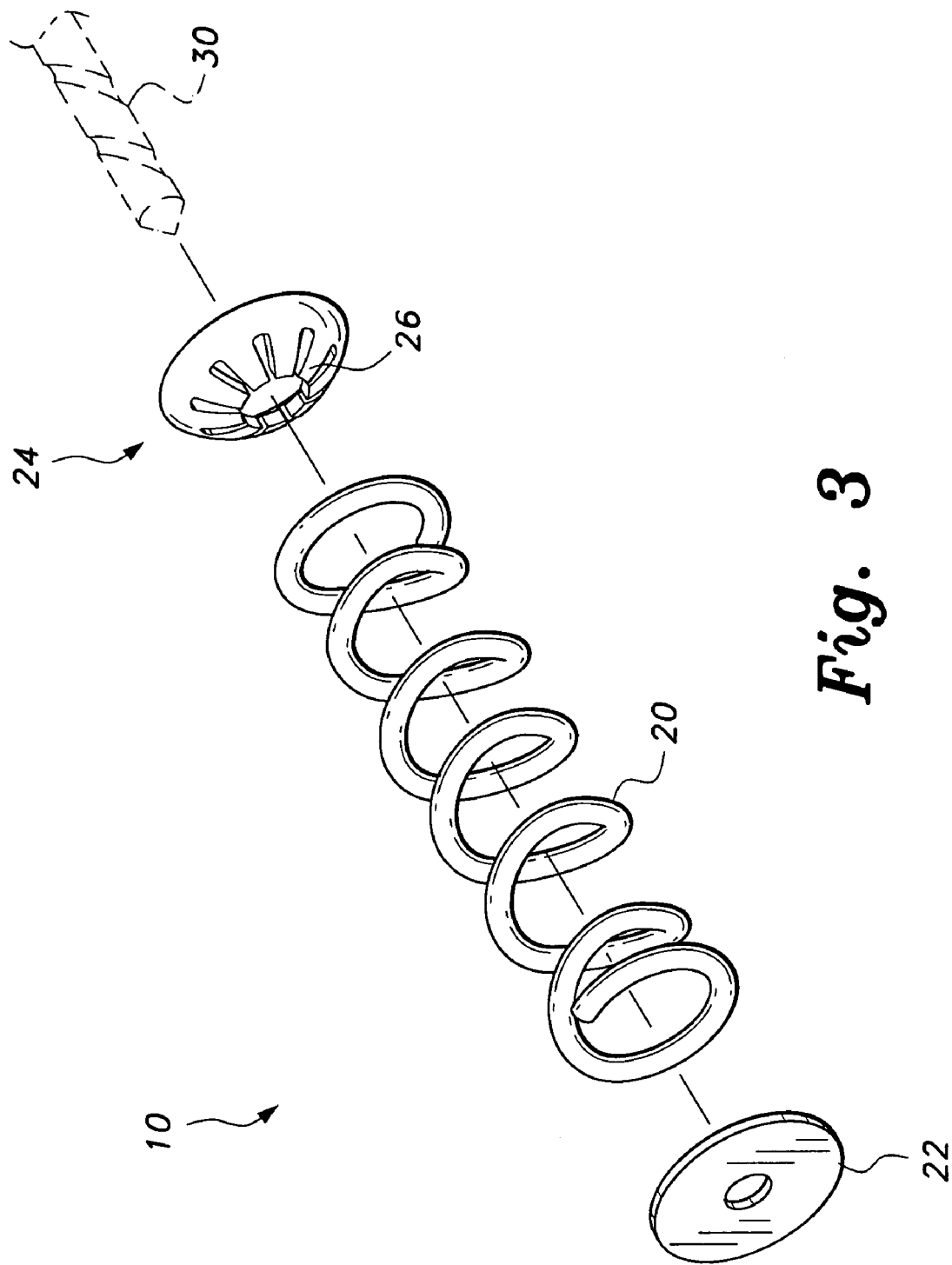
FIG. 3 is an exploded, persective view of the hole saw slug removal device of the first embodiment.

Referring first to FIG. 3, the hole saw slug removal device 10 is shown with a drill bit 30. The slug removal device 10 allows for the drill bit 30 to fit within the device 10. The drill bit 30 anchors the hole saw 12, against a surface 60 of the material to be cut. The slug removal device 10 is made up of a compression spring 20 fixed between two discs 22 and 24. The top disc 22 is a disc of any type, for example, a washer, and may be flat or shaped in a different manner. The top disc 22 may be permanently attached to an end of the spring 20. A bottom disc 24, which may be a washer, may be permanently affixed to the other end of the spring 20. The top 22 and bottom 24 discs may be annular. Both discs 22 and 24 have a hole in the center to allow for the drill bit 30 to fit through each disc 22 and 24.

Figure 5:
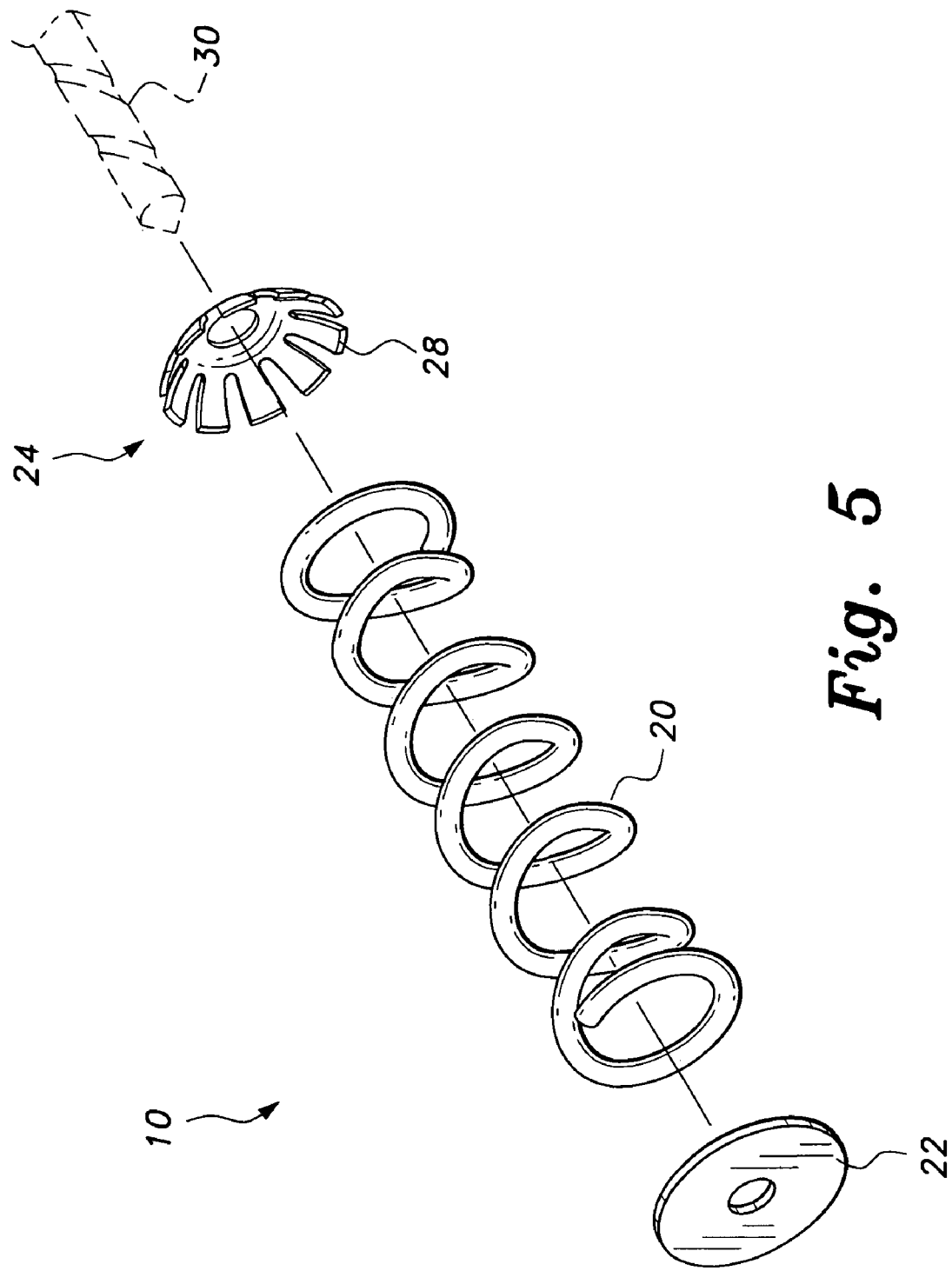
FIG. 5 is an exploded, perspective view of a hole saw slug removal device of the second embodiment.

As shown in FIGS. 1 and 4, the bottom disc 24 serves as a locking mechanism with which to retain the compression spring 20 within the hole saw 12. The bottom disc 24 contains a means for retaining the compression spring 20 within the hole saw 12. In one embodiment, shown in FIG. 1, a means for retaining the compression spring 20 within the hole saw 12 is a set of inner teeth 26 of the bottom disc 24 that lock the slug removal device 10 onto an outer portion of the drill bit 30. As shown in FIGS. 1 and 3, the bottom disc 24 is convexly shaped. In another embodiment, shown in FIG. 4, a means for retaining the compression spring 20 within the hole saw 12 is a set of outer teeth 28 of the bottom disc 24 that lock the slug removal device 10 onto an inner surface of the cylindrical body 14 of the hole saw 12. As shown in FIGS. 4 and 5, the bottom disc 24 is concavely shaped.

Following use of the hole saw 12, the hole saw slug removal device 10 may be removed from the hole saw 12, depending on the type of disc used. For example, if a convex inner-toothed bottom disc 24 is utilized, as in FIG. 1, after the drill bit 30 is disconnected from the hole saw 12, the slug removal device 10 may easily slip out of the hole saw 12. In contrast, if a concave outer-toothed bottom disc 24 is utilized, as in FIG. 4, even after the drill bit 30 is removed from within the hole saw 12, the slug removal device 10 will stay lodged within the hole saw 12.

As shown in FIGS. 1, 2, and 4, after the hole saw slug removal device 10 is inserted within the hole saw 12, an arbor 40 is used to attach the hole saw 12 to a portable drill for powering the hole saw 12. When operated, the hole saw 12 cuts into a surface, such as drywall or the like. The top disc 22 is depressed, compressing the spring 20. A waste material or slug, then becomes wedged into the hole saw 12. Following operation of the hole saw 12, the spring 20 decompresses and the top disc 22 is forced out of the hole saw 12. The slug is then automatically ejected from within the hole saw 12.

Figure 6:
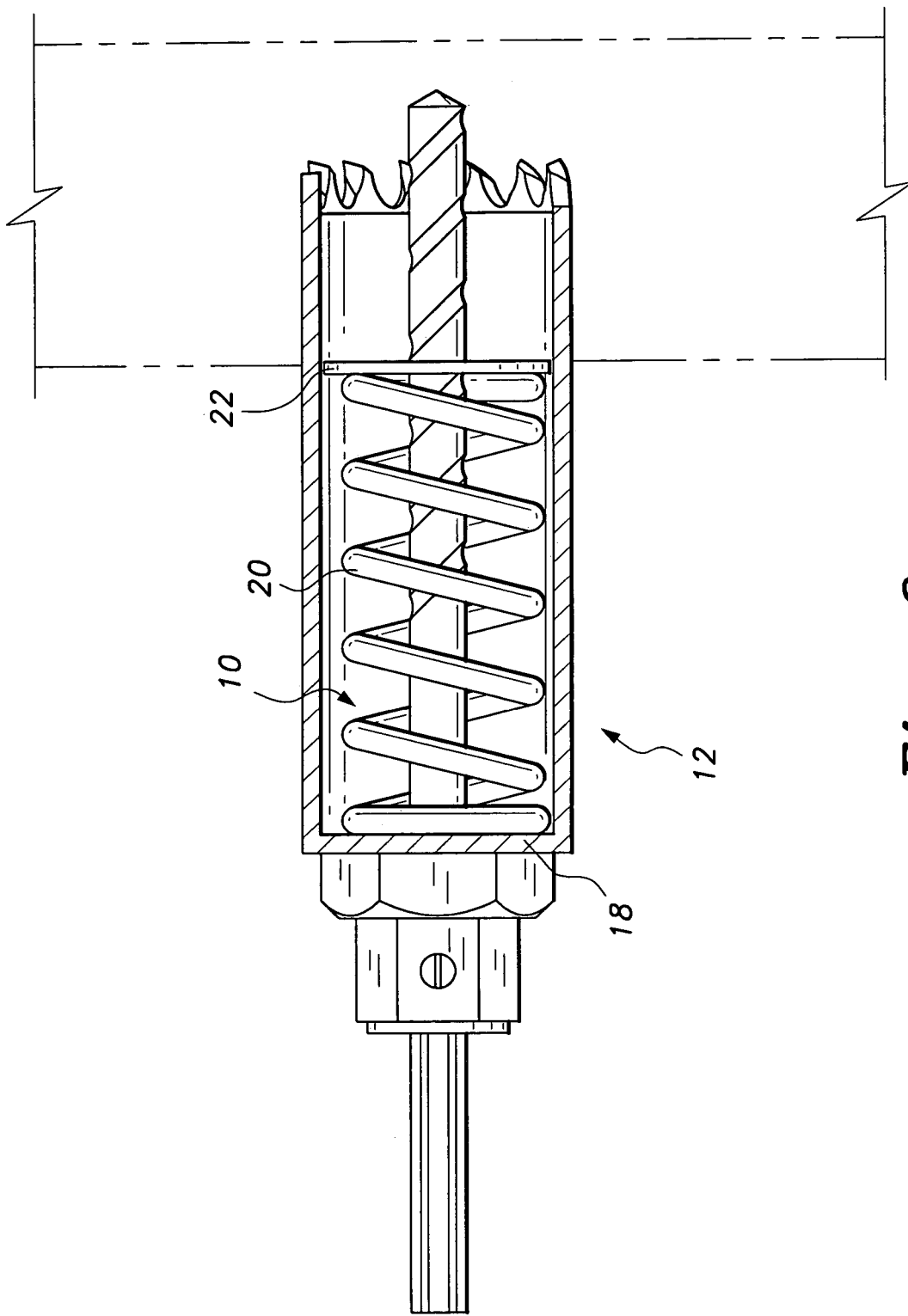
FIG. 6 is a elevational side view of a hole saw and hole saw slug removal device, partly in section, according to a third embodiment of the present invention.

In another embodiment shown in FIG. 6, the hole saw slug removal device 10 is permanently attached to the hole saw 12. According to this embodiment, the slug removal device 10 consists of the compression spring 20 and the top disc 22, which is attached to one end of the compression spring 20. The other end of the compression spring 20 is permanently affixed to the bottom end 18 of the hole saw 12. When the hole saw 12 is operated, the top disc 22 is depressed further into the hole saw 12 by the force of the sawing, compressing the spring 20. A waste slug becomes lodged into the hole saw 12. After the sawing is completed, the compression spring 20 presses the top disc 22 forward and the waste slug is automatically ejected from the hole saw 12.

It is to be understood that the present invention is not limited to the embodiments described above, but encompasses any and all embodiments within the scope of the following claims.

I claim:

1. A hole saw slug removal device for automatic slug ejection, comprising:
    (a) a compression spring having a first end and a second end;
    (b) a first disc attached to said compression spring at the first end of said compression spring; and
    (c) a second disc attached to the second end of said compression spring, the second disc having a plurality of inner teeth for retaining said compression spring within a hole saw, whereby said plurality of inner teeth are capable of locking against an outer portion of a drill bit and of detaching from the drill bit.

2. The hole saw slug removal device according to claim 1, wherein said second disc is convexly shaped.

3. A hole saw slug removal device for automatic slug ejection, comprising:
    (b) a compression spring having a first end and a second end;
    (b) a first disc attached to said compression spring at the first end of said compression spring; and
    (c) a second disc attached to the second end of said compression spring, the second disc having a plurality of outer teeth for retaining said compression spring within a hole saw, whereby said plurality of outer teeth are capable of locking within an inner surface of the hole saw.

4. The hole saw slug removal device according to claim 3, wherein said second disc is concavely shaped.

5. The hole saw slug removal device according to claim 1, wherein said first disc and said second disc are annular.

6. The hole saw slug removal device according to claim 1, wherein said first disc and said second disc are permanently affixed to said compression spring.

* * * * *